(12) United States Patent
Asai

(10) Patent No.: US 11,481,544 B2
(45) Date of Patent: Oct. 25, 2022

(54) FORM PROCESSING APPARATUS AND NON-TRANSITORY COMPUTER READABLE MEDIUM

(71) Applicant: FUJIFILM Business Innovation Corp., Tokyo (JP)

(72) Inventor: Keita Asai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/928,002

(22) Filed: Jul. 14, 2020

(65) Prior Publication Data
US 2021/0286940 A1    Sep. 16, 2021

(30) Foreign Application Priority Data
Mar. 11, 2020   (JP) .............................. JP2020-041700

(51) Int. Cl.
G06F 17/00   (2019.01)
G06F 40/174   (2020.01)

(52) U.S. Cl.
CPC .................. G06F 40/174 (2020.01)

(58) Field of Classification Search
None
See application file for complete search history.

(56) References Cited

U.S. PATENT DOCUMENTS

| 6,996,295 | B2 * | 2/2006 | Tyan .................. G06K 9/00476 382/305 |
| 2015/0256712 | A1 * | 9/2015 | Wshah .................. H04N 1/4177 358/474 |
| 2015/0286398 | A1 * | 10/2015 | Noro ................... G06F 3/04883 345/173 |
| 2017/0046622 | A1 * | 2/2017 | Gaither ................. G06F 40/247 |
| 2017/0329749 | A1 * | 11/2017 | Milward ............... G06F 40/166 |
| 2018/0181808 | A1 * | 6/2018 | Sridharan .......... G06K 9/00483 |
| 2019/0197304 | A1 * | 6/2019 | Sridharan ............. G06F 40/197 |
| 2020/0050845 | A1 * | 2/2020 | Foncubierta Rodriguez ............... G06K 9/00456 |

FOREIGN PATENT DOCUMENTS

| JP | 2004258706 | 9/2004 |
| JP | 2012-208589 | 10/2012 |

OTHER PUBLICATIONS

Sumit, "How to Extract a Substring in Excel Using Formulas", date: Dec. 12, 2016, URL:<https://web.archive.org/web/20161212134803/https://trumpexcel.com/extract-a-substring-in-excel/> (Year: 2016).*

* cited by examiner

*Primary Examiner* — Mustafa A Amin
(74) *Attorney, Agent, or Firm* — JCIPRNET

(57) ABSTRACT

A form processing apparatus includes a processor. The processor is configured to, in a case of extracting text data located near a pre-registered item in a form as data associated with the item, display a form to be processed to register an item, accept from a user an area to be filled in with data to be extracted, the area being included in the form to be processed, and display a text located at a position near the accepted area as a candidate for the item.

13 Claims, 16 Drawing Sheets

FIG. 3

☐ FRAME FIXING SETTING MODE   ☑ LAYOUT ANALYSIS SETTING MODE   ☐ AUTOMATICALLY EXTRACT BLANKS

*Please fill in only the bold sections.

Fiscal Year 2015 Current Status for Application for Child's Benefits/Special Benefits The following is my current status.
I agree to confirm the amount of income etc. based on the current official record to examine the qualifications of the beneficiary.

Date of Submission (month/day/year): __/__/__

Approval Number

| | Name *Signature/Stamp | | Signature | | | |
|---|---|---|---|---|---|---|
| Recipient | Address | | | | | |
| | Telephone Number | | | | | |
| | Residence as of January 1, 2015 | ☐ Same District  ☐ Different District  [Changed to (if any) →] | | | | |
| | Property of Recipient | ☐ Parent(s)  ☐ Guardian  ☐ Person Designated by Parent(s)  ☐ Other | | | | |

| | | | | | | Presence/ Name of Partner | Yes · No | Name | | Gender Male · Female |
|---|---|---|---|---|---|---|---|---|---|---|
| | | | | | | Partner's Occupation | ☐ Unemployed ☐ Private Employee ☐ Government Employee ☐ Self-Employed ☐ Other | Government Employee Workplace | | |
| | | | | | | | | Self-Employed/Other | | |
| | | | | | | Address (Please fill in only when living apart) | | | | |

| | Name | Relationship | Date of Birth | Living | | | | Child Care and Custody | Livelihood | |
|---|---|---|---|---|---|---|---|---|---|---|
| Dependent Child under Age 18 | 1 | | | | Together Apart | ☐ Same District ☐ Different District | | Yes No | Dependent Support | |
| | 2 | | | | Together Apart | ☐ Same District ☐ Different District | | Yes No | Dependent Support | |

☐ AUTOMATIC SETTING OF FRAMES TOGETHER

FIG. 4

[Form 20/21 with fields:]

The following is my current status.
I agree to confirm the amount of income etc. based on the current official record to examine the qualifications of the beneficiary.

| Recipient | Name *Signature/Stamp | | Signature |
|---|---|---|---|
| | Address | | [25] |
| | Telephone Number | [Changed to (if any)] ↑ | |
| | Residence as of January 1, 2015 | ☐ Same District  ☐ Different District  ☐ Overseas | |

| READ SETTING | VALUE |
|---|---|
| NAME | RECIPIENT ADDRESS |
| RECOGNIZED TEXT TYPE | ADDRESS |
| RESTRICTION OF TEXT TYPE | NO RESTRICTION |
| SINGLE/DOUBLE-BYTE ALPHANUMERIC CHARACTERS | ALWAYS AS SINGLE-BYTE CHARACTERS |
| RECTANGULAR COORDINATES | 679, 830, 725, 280 |

26

| OUTPUT SETTING | VALUE |
|---|---|
| HEADER NAME | RECIPIENT ADDRESS |
| ROW ORDER | 5 |
| REPLACEMENT TEXT FOR BLANK | – |

The following is my current status.
I agree to confirm the amount of income etc. based on the current official record to examine the qualifications of the beneficiary.

| Recipient | Name *Signature/Stamp | | Signature |
|---|---|---|---|
| | Address | | |
| | Telephone Number | | |
| | Residence as of January 1, 2015 | ☐ Same District ☐ Different District [Changed to (if any)] ☐ Overseas | |

| READ SETTING | VALUE |
|---|---|
| NAME | *PLEASE ENTER* |
| RECOGNIZED TEXT TYPE | ADDRESS |
| RESTRICTION OF TEXT TYPE | NO RESTRICTION |
| SINGLE/DOUBLE-BYTE ALPHANUMERIC CHARACTERS | ALWAYS AS SINGLE-BYTE CHARACTERS |
| RECTANGULAR COORDINATES | 679, 830, 725, 280 |
| SEARCH SETTING | [AUTOMATIC SETTING] [MANUAL SETTING] |

| KEY DEFINITION INFORMATION | TEXT | SEARCH DIRECTION |
|---|---|---|
| CONDITION 1 | ADDRESS | RIGHTWARD |

FIG. 7

□ FRAME FIXING SETTING MODE    ☑ LAYOUT ANALYSIS SETTING MODE    □ AUTOMATICALLY EXTRACT BLANKS

\*Please fill in only the bold sections.

Fiscal Year 2015 Current Status for Application for Child's Benefits/Special Benefits The following is my current status.
I agree to confirm the amount of income etc. based on the current official record to examine the qualifications of the beneficiary.

Date of Submission (month/day/year): __ / __ / __    Approval Number: ____

| | | Signature | | | | | |
|---|---|---|---|---|---|---|---|
| Recipient | Name *Signature/Stamp | | | | Date of Birth (month/day/year) __ / __ / __ | | Gender Male · Female |
| | Address | | | | Name | | |
| | Telephone Number | | | | | | |
| | Residence as of January 1, 2015 | □ Same District  □ Different District  Changed to (if any) → □ Overseas | | Presence/ Name of Partner | Yes · No | | |
| | Property of Recipient | □ Parent(s)  □ Guardian  □ Person Designated by Parent(s)  □ Other | | Partner's Occupation | □ Unemployed □ Private Employee □ Government Employee □ Self-Employed □ Other | Government Employee Workplace | |
| | | | | | | Self-Employed/Other | |
| | | | | Address (Please fill in only when living apart) | | Child Care and Custody | Livelihood |
| Dependent Child under Age 18 | | Name | Relationship | Date of Birth | Living | | | |
| | 1 | | | | Together Apart | □ Same District □ Different District | Yes  No | Dependent  Support |
| | 2 | | | | Together Apart | □ Same District □ Different District | Yes  No | Dependent  Support |

□ AUTOMATIC SETTING OF FRAMES TOGETHER

FIG. 8

| | Name | Relationship | Date of Birth | Living | Address (Please fill in only when living apart) |
|---|---|---|---|---|---|
| | | | | Together Apart | ☐ Same District ☐ Different District |
| 1 | (1) | (2) | (3) | | |
| 2 | (4) | (5) | (6) | Together Apart | ☐ Same District ☐ Different District |
| Dependent Child under Age 18 | | | | | |

| READ SETTING | VALUE |
|---|---|
| NAME | FRAME 1 |
| RECOGNIZED TEXT TYPE | NAME |
| RESTRICTION OF TEXT TYPE | NO RESTRICTION |
| SINGLE/DOUBLE-BYTE ALPHANUMERIC CHARACTERS | ALWAYS AS SINGLE-BYTE CHARACTERS |
| RECTANGULAR COORDINATES | 251, 1135, 315, 250 |
| SEARCH SETTING | AUTOMATIC SETTING   MANUAL SETTING |

| FRAME NUMBER | TEXT | SEARCH DIRECTION |
|---|---|---|
| (1) | NAME | DOWNWARD |
| (2) | RELATIONSHIP | DOWNWARD |
| (3) | DATE OF BIRTH | DOWNWARD |
| (4) | NAME | DOWNWARD |
| (5) | RELATIONSHIP | DOWNWARD |
| (6) | DATE OF BIRTH | DOWNWARD |

| KEY DEFINITION INFORMATION | TEXT | SEARCH DIRECTION |
|---|---|---|
| CONDITION 1 | NAME | DOWNWARD |
| CONDITION 2 | 1 | RIGHTWARD |

FIG. 9

| READ SETTING | | |
|---|---|---|
| NAME | VALUE | |
| RECOGNIZED TEXT TYPE | *PLEASE ENTER* | |
| RESTRICTION OF TEXT TYPE | ADDRESS | |
| SINGLE/DOUBLE-BYTE ALPHANUMERIC CHARACTERS | NO RESTRICTION | |
| RECTANGULAR COORDINATES | ALWAYS AS SINGLE-BYTE CHARACTERS | |
| SEARCH SETTING | 679, 830, 725, 280 | |
| | AUTOMATIC SETTING | MANUAL SETTING |

| KEY DEFINITION INFORMATION | TEXT | SEARCH DIRECTION |
|---|---|---|
| | | ADD |

FIG. 12

| READ SETTING | VALUE |
|---|---|
| NAME | *PLEASE ENTER* |
| RECOGNIZED TEXT TYPE | ADDRESS |
| RESTRICTION OF TEXT TYPE | NO RESTRICTION |
| SINGLE/DOUBLE-BYTE ALPHANUMERIC CHARACTERS | ALWAYS AS SINGLE-BYTE CHARACTERS |
| RECTANGULAR COORDINATES | 679, 830, 725, 280 |
| SEARCH SETTING | AUTOMATIC SETTING / MANUAL SETTING |

| SEARCH SETTING | VALUE |
|---|---|
| PRIORITY IN FORM | NO SETTING |
| SEARCH FORMAT PATTERN | ⋯ |
| KEY DEFINITION INFORMATION | TEXT |
| CONDITION 1 | ADDRESS | SEARCH DIRECTION RIGHTWARD |

PLURAL CANDIDATE KEYS WERE DETECTED. PLEASE ADD ANY CONDITION.

FIG. 13

| KEY DEFINITION INFORMATION | TEXT | SEARCH DIRECTION |
|---|---|---|
| CONDITION 1 | ADDRESS OR LOCATION | RIGHTWARD |

FIG. 14

*Please fill in only the bold sections.

Fiscal Year 2015 Current Status for Application for Child's Benefits/Special Benefits

The following is my current status.
I agree to confirm the amount of income etc. based on the current official record to examine the qualifications of the beneficiary.

| Name *Signature/Stamp | John Doe | Signature |
|---|---|---|
| Address | 123 Main St., Anytown, NY 12345 | № |

| READ SETTING | VALUE |
|---|---|
| NAME | *PLEASE ENTER* |
| RECOGNIZED TEXT TYPE | ADDRESS |
| RESTRICTION OF TEXT TYPE | NO RESTRICTION |
| SINGLE/DOUBLE-BYTE ALPHANUMERIC CHARACTERS | ALWAYS AS SINGLE-BYTE CHARACTERS |
| RECTANGULAR COORDINATES | 679, 830, 725, 280 |
| SEARCH SETTING | AUTOMATIC SETTING   MANUAL SETTING |

| SEARCH SETTING | VALUE |
|---|---|
| PRIORITY IN FORM | NO SETTING |
| SEARCH FORMAT PATTERN | |

FIG. 15A

| SEARCH SETTING | VALUE |
|---|---|
| PRIORITY IN FORM | NO SETTING |
| SEARCH FORMAT PATTERN | ... —40 |

FIG. 15B

| SEARCH SETTING | VALUE |
|---|---|
| PRIORITY IN FORM | NO SETTING |
| SEARCH FORMAT PATTERN | ... |
| KEY DEFINITION INFORMATION | FORMAT PATTERN |
| | |
| | |

FIG. 15C

| SEARCH SETTING | VALUE |
|---|---|
| PRIORITY IN FORM | NO SETTING |
| SEARCH FORMAT PATTERN | ... |
| KEY DEFINITION INFORMATION | FORMAT PATTERN |
| REGULAR EXPRESSION 1 | Fiscal Year [0-9]{4} |
| REGULAR EXPRESSION 2 | FY [0-9]{4} |

# FORM PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-041700 filed Mar. 11, 2020.

BACKGROUND

(i) Technical Field

The present disclosure relates to a form processing apparatus and a non-transitory computer readable medium.

(ii) Related Art

A method for extracting text data from image data of a form involves generating in advance data that defines a position of the text data to be extracted from the form, and, in response to the form being read, performing character recognition processing on the form using the data defined in advance for the form to extract the text data.

Another method involves defining in advance an item associated with text data, extracting, in response to a form being read, the item from the form, and extracting the text data using a position of the text data relative to the extracted item or a format pattern of the text data.

Examples of the related art are shown in Japanese Unexamined Patent Application Publication No. 2004-258706 and Japanese Unexamined Patent Application Publication No. 2012-208589.

SUMMARY

In a form containing items, to extract text data located near an item as data associated with the item, the item is generally registered in advance. However, even if a user knows an area of text data to be extracted, it may be difficult for the user to identify an item suitable for extracting the area. It is time-consuming for the user to identify the item.

Aspects of non-limiting embodiments of the present disclosure relate to extraction of text data located near a pre-registered item in a form as data associated with the item, in which when the item is to be registered, the load on the user to identify the item is reduced compared with a case where no candidate is displayed for the item associated with the data to be extracted.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a form processing apparatus including a processor. The processor is configured to, in a case of extracting text data located near a pre-registered item in a form as data associated with the item, display a form to be processed to register an item, accept from a user an area to be filled in with data to be extracted, the area being included in the form to be processed, and display a text located at a position near the accepted area as a candidate for the item.

BRIEF DESCRIPTION OF THE DRAWINGS

An exemplary embodiment of the present disclosure will be described in detail based on the following figures, wherein:

FIG. 3 illustrates an example of a form display screen according to the exemplary embodiment;

FIG. 4 illustrates an example of a principal portion of the form display screen in a frame fixing setting mode according to the exemplary embodiment;

FIG. 5 illustrates an example of a principal portion of the form display screen in a layout analysis setting mode according to the exemplary embodiment;

FIG. 7 illustrates an example of the form display screen according to the exemplary embodiment;

FIG. 8 illustrates a principal portion of a form display screen displayed in response to the selection of an automatic setting button on the form display screen according to the exemplary embodiment;

FIG. 9 illustrates a principal portion of the form display screen according to the exemplary embodiment;

FIG. 12 illustrates a principal portion of the form display screen according to the exemplary embodiment;

FIG. 13 illustrates key definition information contained in the form display screen according to the exemplary embodiment;

FIG. 14 illustrates a principal portion of the form display screen according to the exemplary embodiment; and FIGS. 15A to 15C illustrate transitions of settings in key definition information contained in the form display screen illustrated in FIG. 14.

DETAILED DESCRIPTION

The following describes an exemplary embodiment of the present disclosure with reference to the drawings.

A form processing apparatus according to this exemplary embodiment is implementable by a hardware configuration of an existing general-purpose computer such as a personal computer (PC). Specifically, the form processing apparatus includes a central processing unit (CPU), storage means such as a read-only memory (ROM), a random access memory (RAM), and a hard disk drive (HDD), user interface means such as input means including a mouse and a keyboard, and display means including a display, and communication means including a network interface.

Figure 1:
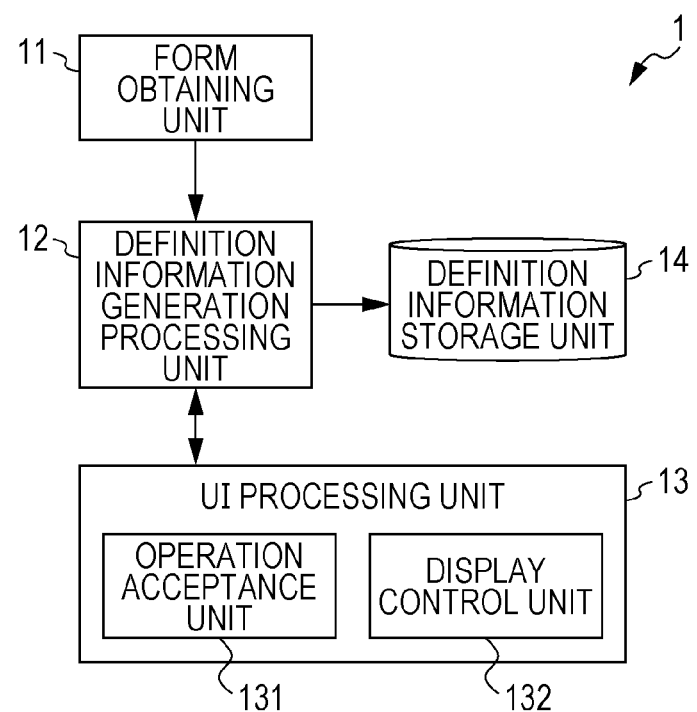
FIG. 1 is a block diagram illustrating a form processing apparatus according to an exemplary embodiment of the present disclosure.

FIG. 1 is a block diagram illustrating a form processing apparatus 1 according to an exemplary embodiment of the present disclosure. The form processing apparatus 1 according to this exemplary embodiment includes a form obtaining unit 11, a definition information generation processing unit 12, a user interface (UI) processing unit 13, and a definition information storage unit 14. Elements not presented in this exemplary embodiment are not illustrated in FIG. 1.

The form obtaining unit 11 obtains image data of a form. The term "form" refers to a type of document and is used to indicate a document containing text in a predetermined format. The image data of the form is generated by reading the form using a scanner. In this exemplary embodiment, for convenience of description, image data of a form is simply referred to as a "form". The definition information generation processing unit 12 generates definition information of text data to be extracted from the form and definition information on an item for the text data. The user interface processing unit 13 includes an operation acceptance unit 131 and a display control unit 132. The operation acceptance unit 131 accepts an operation performed by the user using the mouse, the keyboard, and so on. The display control unit 132 controls display on the display in accordance with an instruction from the definition information generation processing unit 12. The definition information storage unit 14 stores the definition information generated by the definition information generation processing unit 12.

The elements 11 to 13 of the form processing apparatus 1 are implemented by cooperation of a computer forming the form processing apparatus 1 and a program executed by a CPU of the computer. The definition information storage unit 14 is implemented by the HDD in the form processing apparatus 1. Alternatively, external storage means may be used via a network.

The program used in this exemplary embodiment may be provided by a communication means, or may be stored in a computer-readable recording medium such as a compact disc read-only memory (CD-ROM) or a Universal Serial Bus (USB) memory and provided therethrough. The program provided through a communication means or a recording medium is installed into the computer, and the CPU of the computer sequentially executes the program to implement various types of processing.

Examples of a method for automatically extracting text data from a form includes a first method and a second method. In the first method, form definition data that defines an area of text data to be extracted from a form is generated in advance, and, in response to a form being read, the position of text data to be extracted is identified by using an area of the text data to be extracted, which is defined in form definition data corresponding to the form. In the second method, form definition data that defines in advance items associated with text data is generated, and, in response to a form being read, an item is searched for from within the form by using items defined in form definition data corresponding to the form to identify a position at which text data associated with the item is to be extracted.

In the first method, if the layout of the form changes, the area of the text data to be extracted also changes. As a result, the form definition data may not become available. This inconvenience does not arise in the second method. However, since items that are the same in meaning may be expressed in different words or phrases depending on the operation or form, the accuracy of extraction of text data differs depending on what is defined as an item in form definition data. In many cases, the definition of items in form definition data is actually determined by the user, and some users may not be able to determine what is defined as an item. This may influence the accuracy of extraction of text data. One feature of this exemplary embodiment is to make use of advantages of the two extraction methods described above. Specifically, the position of text data to be extracted is designated to extract a candidate for the corresponding item, and the candidate is presented to the user to assist in generating form definition data (corresponding to the "definition information" described above), in particular, item definition information described below. The term "item definition information" refers to definition information indicating a positional relationship between a candidate for an item and an area to be filled in with text data to be extracted.

In this exemplary embodiment, the form processing apparatus 1 is capable of operating in two setting modes including a frame fixing setting mode and a layout analysis setting mode. The frame fixing setting mode is a mode corresponding to the first method in the two extraction methods described above. The layout analysis setting mode is a mode for assisting in generating item definition information, which is a feature of this exemplary embodiment, by using the technique of the second method described above.

In this exemplary embodiment, in the description of the layout analysis setting mode, items contained in a form are referred to as "keys". For example, the form may be an invoice. In this case, specific texts of items contained in the invoice, such as "date of issuance" and "invoice number", correspond to keys. In a form, typically, text data is entered near each key in association with the key. For example, text data indicating the date of issuance is entered near the key "date of issuance" in the form of a date, and text data indicating a number is entered near the key "invoice number". In this exemplary embodiment, text data entered in association with each key is referred to as a "value". In response to detection of a predetermined specific text corresponding to a key in a form as a result of analysis of the form, a value is present near the key (typically, to the right of or below the key), and thus it is possible to extract a set of key and value from the form. That is, it is possible to automatically extract a set of key and value from a read image of a form (corresponding to the "image data" described above) obtained by scanning the form. A process of extracting a key and a value in accordance with the definition information generated in the layout analysis setting mode is referred to as a "key-value extraction process".

In the key-value extraction process, only a key or only a value is sometimes extracted. In the following description, however, a set of key and value is extracted from a form, unless otherwise noted. In this exemplary embodiment, the term "text" is used to include both a single word or character and a sequence of words or characters, unless otherwise noted.

Figure 2A:
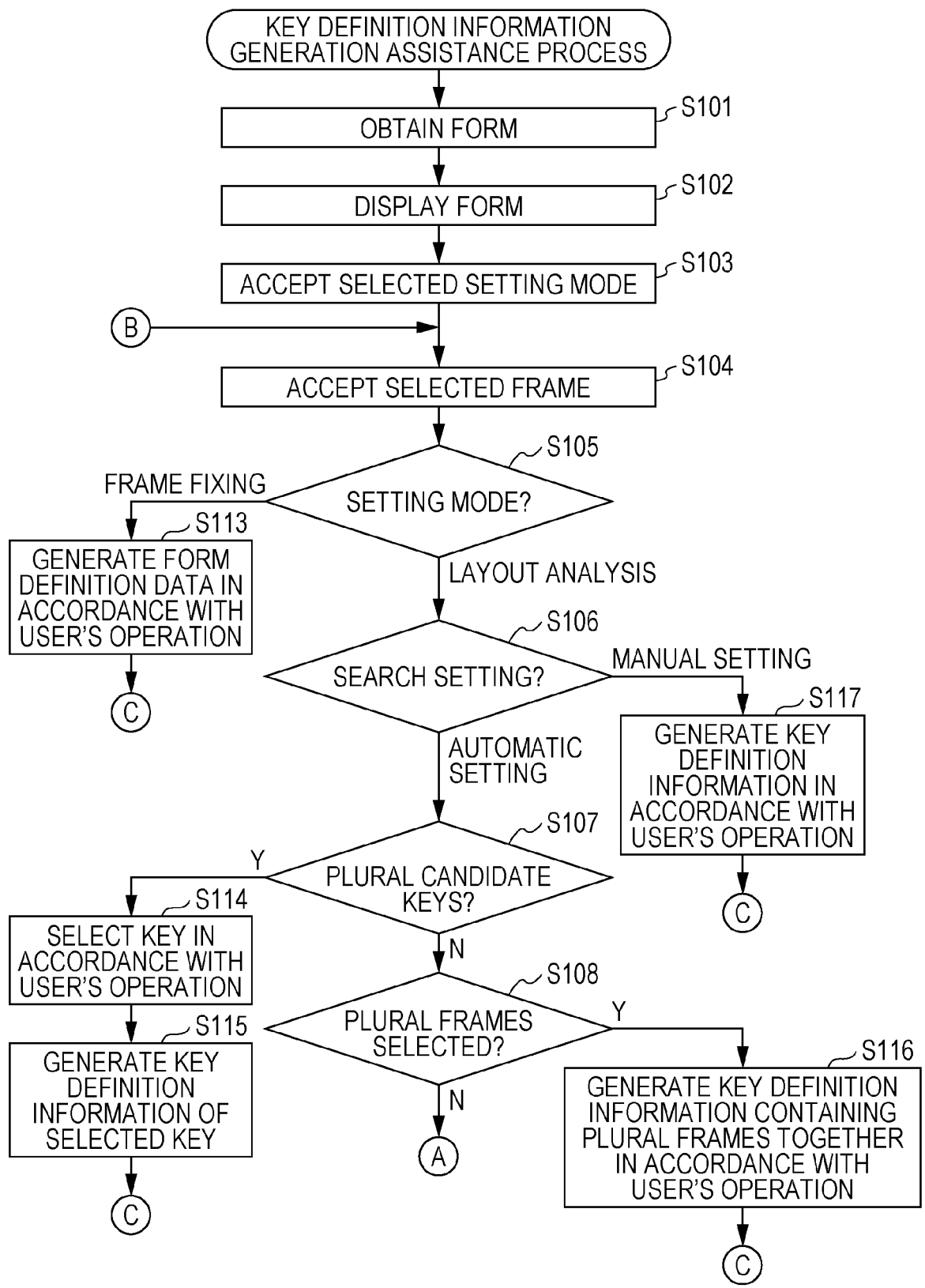
FIG. 2A is a flowchart illustrating a key definition information generation assistance process according to the exemplary embodiment.
Figure 2B:
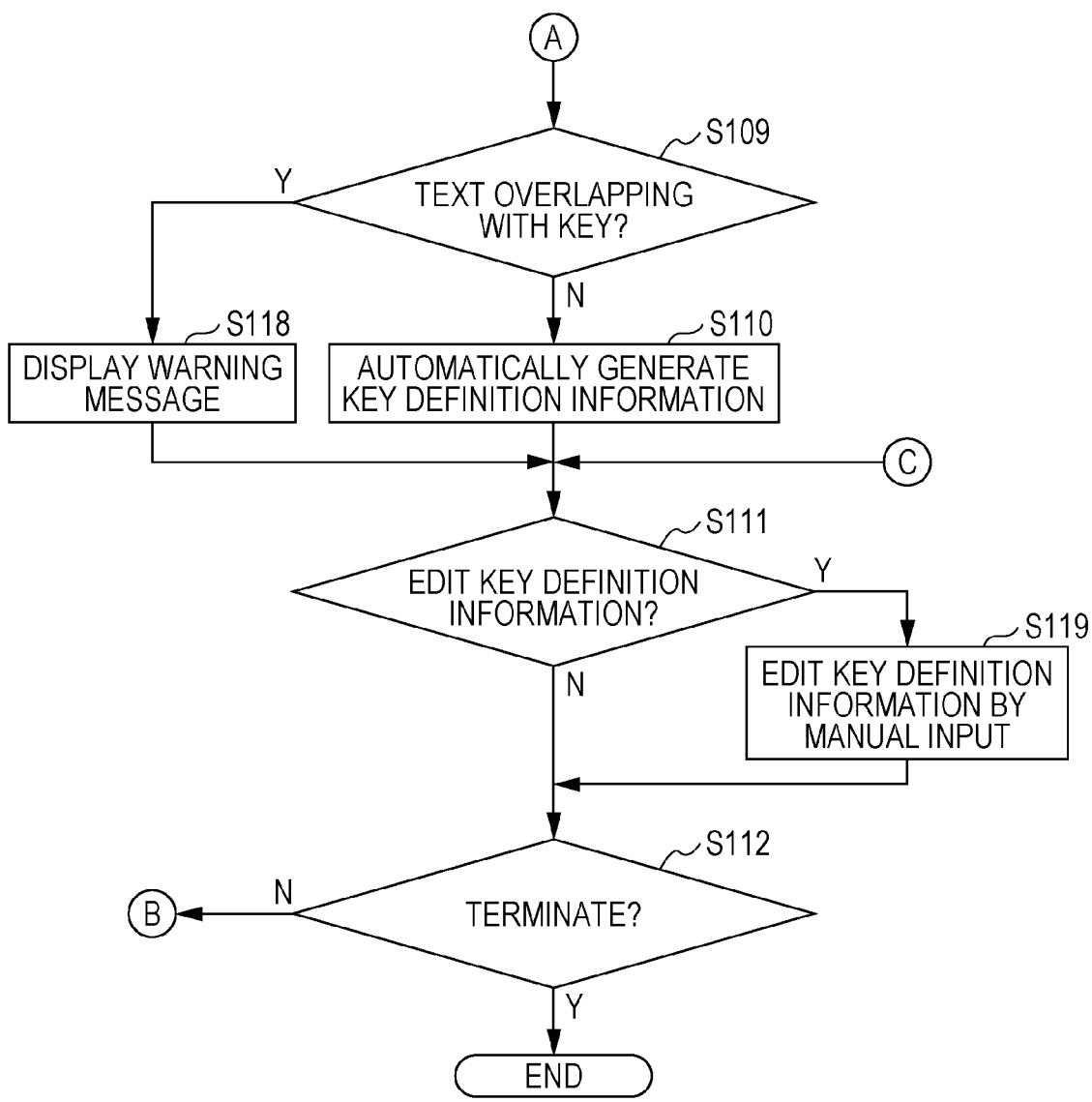
FIG. 2B is a flowchart continued from FIG. 2A.

The definition information generation processing unit 12 generates definition information for automatically extracting a key and a value from a form. Specifically, the definition information generation processing unit 12 generates key definition information for a key and value definition information for a value. In particular, this exemplary embodiment provides a tool for assisting a user in generating key definition information. A key definition information generation assistance process using such a tool, which is a feature of this exemplary embodiment, will be hereinafter described with reference to a flowchart illustrated in FIGS. 2A and 2B.

First, the form obtaining unit 11 obtains a form to be processed (step S101). The form is generated by, for example, causing an image forming device having a scanning function to read a form. The form obtaining unit 11 directly or indirectly obtains the form from the image forming device.

When the form is obtained, the definition information generation processing unit 12 causes the display control unit 132 to display the form on a screen (step S102). The display control unit 132 performs control to display the form on the display in accordance with an instruction from the definition information generation processing unit 12. In the following, the description of the operation of the display control unit 132 is omitted whenever appropriate, for simplicity.

FIG. 3 illustrates an example of a form display screen according to this exemplary embodiment. A form display screen 20 includes a form display region 21, checkboxes 22*a* and 22*b* for selecting modes, an "automatically extract blanks" button 23, and an "automatic setting of frames together" button 24.

As described above, the key definition information generation assistance process according to this exemplary embodiment supports two setting modes including a frame fixing setting mode and a layout analysis setting mode. The form processing apparatus 1 operates in the frame fixing setting mode in response to the selection of the checkbox 22*a*, and operates in the layout analysis setting mode in response to the selection of the checkbox 22*b*. When the user selects one of the checkboxes 22*a* and 22*b* in the form display screen 20 and selects the setting mode to be enabled, the operation acceptance unit 131 accepts the selected setting mode (step S103). The operation in response to the selection of the "automatically extract blanks" button 23 and the operation in response to the selection of the "automatic setting of frames together" button 24 will be described below.

Then, the user selects a frame to be processed from among frames contained in the currently displayed form. The term "frame" refers to an area surrounded by borders. Each frame corresponds to a field to be filled in with text data to be extracted. An area to be filled in with text data is identified using the relative position of the area in the form (for example, coordinate data of the left right corner of the area having a rectangular shape) and the size of the area. In this exemplary embodiment, causing the user to designate a frame is equivalent to causing the user to designate both the relative position and size of the area. The operation acceptance unit 131 accepts the designated frame (step S104). In this exemplary embodiment, the user moves the mouse cursor to a desired frame and then clicks the mouse to select the frame. It should be noted that any other frame selection operation may be used.

As described above, an operation performed by the user is accepted by the operation acceptance unit 131. In the following, the description of the operation of the operation acceptance unit 131 to accept the user's operation is omitted whenever appropriate, for simplicity.

First, the operation in response to the user selecting the frame fixing setting mode ("frame fixing" in step S105) will be described.

FIG. 4 illustrates a principal portion of the form display screen 20 according to this exemplary embodiment and illustrates an example screen displayed in response to the user selecting the frame fixing setting mode. In FIG. 4, a portion of the form displayed in the form display region 21, which includes a frame 25 selected by the user in step S104, is illustrated. In FIG. 4, the frame 25 to be filled in with text data indicating an address is selected, as an example. In this exemplary embodiment, information necessary for the description is extracted and illustrated, and the layout of the screen, that is, the locations in which the portion of the form and tables 26 and 27 are displayed, is not limited to that in the illustrated example. The same applies to the figures used in the following description.

When the user selects the frame 25, the definition information generation processing unit 12 displays on the screen an input setting table of form definition data for the text data, more specifically, the tables 26 and 27 in which the user inputs read setting information and output setting information, respectively. In FIG. 4, the user has input information in the tables 26 and 27. The read setting information contains conditions and the like for reading text data input in the frame 25. The read setting information includes "name", "recognized text type", "restriction of text type", "single/double-byte alphanumeric characters", and "rectangular coordinates". The "name" field contains a name as information for identifying the frame 25. The "recognized text type" field contains dictionary data to be used to read the text data entered in the frame 25. The "restriction of text type" field contains types of characters available for the text data, such as alphabetical letters and numbers. The "single/double-byte alphanumeric characters" field contains whether to read the text data as double-byte characters or single-byte characters. The "rectangular coordinates" field provides information indicating an area of the frame 25 in the form and contains coordinate data and the width and height of the frame 25. The coordinate data indicates the relative position of the left corner of the frame 25 having a rectangular shape in the form. The rectangular coordinates are automatically set in response to the user selecting the frame 25. The output setting information contains conditions and the like for outputting the text data entered in the frame 25. The output setting information includes "header name", "row order", and "replacement text for blank". The "header name" field contains a name given when the text data is output. The "row order" field contains the arrangement order when the text data is output. The "replacement text for blank" field contains characters, symbols, and the like that are output in place of the text data if the extraction of the text data fails.

As described above, upon generating form definition data for text data (step S113), the definition information generation processing unit 12 stores the form definition data in the definition information storage unit 14 in response to a predetermined storing operation performed by the user. Then, the process proceeds to step S111. The processing of step S111 and the subsequent steps will be described below.

Then, the operation in response to the user selecting the layout analysis setting mode ("layout analysis" in step S105) will be described.

FIG. 5 illustrates a principal portion of the form display screen 20 according to this exemplary embodiment and illustrates an example screen displayed in response to the user selecting the layout analysis setting mode. In FIG. 5, a portion of the form displayed in the form display region 21, which includes the frame 25 selected by the user in step S104, is illustrated. In FIG. 5, the frame 25 to be filled in with text data indicating an address is selected, by way of example.

When the user selects the frame 25, the definition information generation processing unit 12 displays on the screen a table (hereinafter referred to as "value definition information") 28 in which the user inputs definition information regarding text data, that is, a value. In the key-value extraction process, the position of a key is searched for, and a text or character string (i.e., value) located near the found position of the key is automatically extracted. Thus, position information (i.e., rectangular coordinates) of the frame 25, which is obtained by analyzing the form, is not necessary. In FIG. 5, accordingly, the "rectangular coordinates" row is grayed out to indicate that this row is unnecessary.

The value definition information 28 in the layout analysis setting mode (corresponding to the read setting information of the form definition data in the frame fixing setting mode) further contains the item "search setting". The "search setting" field contains an automatic setting button 29 and a manual setting button 30. The automatic setting button 29 is used by the user to select automatic setting for automatically searching for a key. The manual setting button 30 is used by the user to select manual setting for allowing the user to designate a key.

The user is assumed to select the automatic setting button 29. The selection may be performed by operating the mouse. In this case ("automatic setting" in step S106), if the definition information generation processing unit 12 automatically analyzes the form and recognizes that a plurality of candidate keys are not present (N in step S107), that a plurality of frames are not selected (N in step S108), and that no text overlapping with the key is present (N in step S109), the definition information generation processing unit 12 extracts the text located to the left of the frame 25, namely, "address" in the illustrated example, as a candidate key (i.e., item) and automatically generates key definition information 31 (step S110). The value definition information 28 is generated and displayed in response to the frame 25 being selected, whereas the key definition information 31 is displayed on the screen at the time when the automatic setting button 29 in the value definition information 28 is selected. The key definition information 31 indicates information itself or indicates a table showing key definition information. For convenience of description, key definition information indicating information and key definition information indicating a table are both represented by the key definition information 31.

The key definition information 31 includes items "text" and "search direction". The item "text" indicates a specific text serving as a key, which is extracted in accordance with the position of the frame 25 that is designated. The item "search direction" indicates a direction in which a value is located relative to the key. In the key-value extraction process, a specific text (i.e., key) in the form, which is designated in the item "text", is searched for and extracted, and text data present in the "search direction" relative to the extracted key is automatically extracted as a value. The key definition information 31 illustrated in FIG. 5 contains a single text "address" as the item "text", and "rightward" as the item "search direction".

The definition information generation processing unit 12 searches for a key corresponding to the frame 25 in accordance with a predetermined search condition. In the form illustrated as an example in FIG. 3, a value corresponding to a key is typically located to the right of or below the key. In other words, a key corresponding to a value is typically located to the left of or above the value. Accordingly, the definition information generation processing unit 12 searches for a text located to the left of or above the frame 25 in accordance with the search condition. In accordance with a further search condition, the definition information generation processing unit 12 searches for a text located just close to the frame 25 or located within a range less than or equal to a predetermined threshold value relative to the frame 25. In FIG. 5, only the text "address" surrounded by a rectangular box 32 is extracted, as an example. Accordingly, the definition information generation processing unit 12 sets "address" as the item "text". In addition, since the frame 25 is located to the right of the text "address", "rightward" is set as the item "search direction". To extract a value to be entered in the frame 25, the key definition information 31 generated in the way described above is referred to. That is, in the key-value extraction process, the text "address" is searched for, and, in response to the text "address" being found, a value located to the right of the text "address" in accordance with the search direction is automatically extracted.

To present to the user which text is successfully extracted, as illustrated in FIG. 5, the definition information generation processing unit 12 may display the extracted text with the box 32 therearound.

As described above, the definition information generation processing unit 12 presents to the user a text located near the frame 25 designated by the user as a candidate key. In response to a predetermined storing operation performed by the user, the definition information generation processing unit 12 stores the generated key definition information in the definition information storage unit 14. The definition information generation processing unit 12 stores the generated key definition information and value definition information in the definition information storage unit 14 in response to a predetermined storing operation performed by the user or at an appropriate timing. In the following, the description of the process of storing such information in the definition information storage unit 14 is omitted.

The editing of the key definition information (Y in step S111 and then step S119) will be described below. In response to the user performing an operation of terminating the process (N in step S111 and Y in step S112), the process ends, or, otherwise (N in step S112), the process proceeds to step S104 to process another frame.

In the example described with reference to FIG. 5, a single text "address" is extracted as a candidate key. Depending on the search condition, a plurality of texts may be extracted as candidate keys. A plurality of texts may be extracted as candidate keys, for example, when no search direction is specified for the frame 25 or when the predetermined threshold value is increased.

In a case where the user selects the automatic setting button 29 ("automatic setting" in step S106), if a plurality of candidate keys are present (Y in step S107), the definition information generation processing unit 12 selects a key from among the plurality of candidate keys in accordance with the user's operation (step S114).

Figure 6:
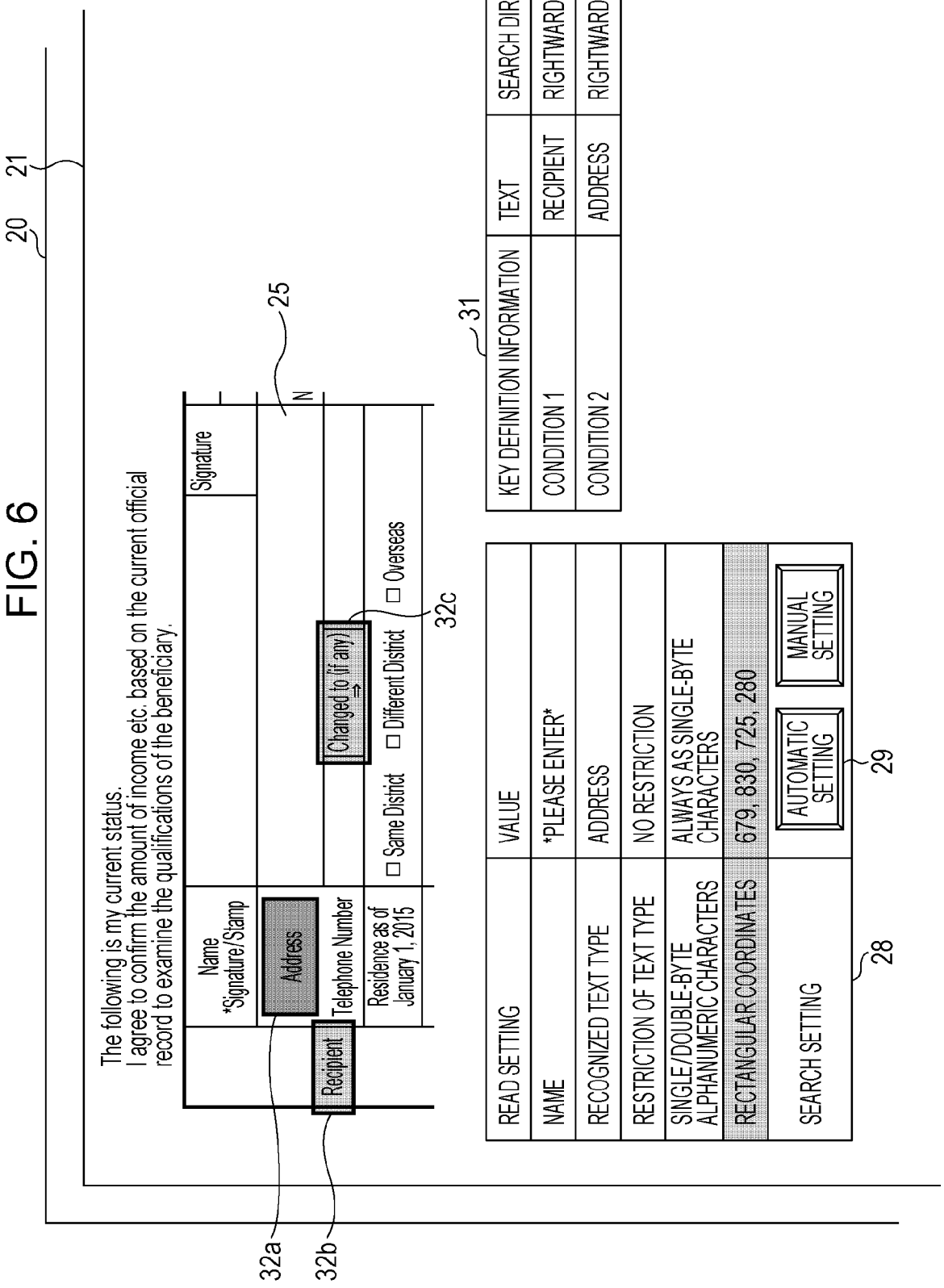
FIG. 6 illustrates another example of the principal portion of the form display screen in the layout analysis setting mode according to the exemplary embodiment.

FIG. 6 illustrates a principal portion of the form display screen 20 according to this exemplary embodiment and illustrates an example screen similar to that in FIG. 5. In FIG. 6, texts found as candidate keys are surrounded by boxes 32a, 32b, and 32c.

In this exemplary embodiment, candidate keys are assigned priorities in accordance with the compliance with the search condition. For example, priorities may be based on the direction relative to and distance from the frame 25. In this case, a high priority is placed on a text located to the left of or above the frame 25. Further, the priority increases as the distance from the frame 25 decreases. In FIG. 6, the text "address", which is the closest to the frame 25 and is located to the left of the frame 25, is displayed so as to have the highest priority. In FIG. 6, the priorities are indicated by the intensity of color in the boxes 32a, 32b, and 32c, by way of example but not limitation. Any other display method may be used to indicate priorities, or priorities may be indicated by characters.

The definition information generation processing unit 12 sets priorities in accordance with the direction relative to and distance from the frame 25. Alternatively, the definition information generation processing unit 12 may display candidate keys such that the candidate keys are assigned priorities in accordance with at least one of the distance of the texts from the frame 25 or the direction of the texts relative to the frame 25.

It is assumed that the user selects "address" and "recipient" as candidate keys. For example, the user performs a selection operation such as clicking in the corresponding boxes 32a and 32b. In response to the selection operation of the user, the definition information generation processing unit 12 automatically generates the key definition information 31 containing "address" and "recipient" as candidate keys (step S115).

In the key-value extraction process, accordingly, the key definition information 31 generated in the way described above is referred to, the texts "address" and "recipient" are extracted from the form, and a value that is located to the right of the text "address" and that is located to the right of the text "recipient" in accordance with the search direction is automatically extracted.

In the foregoing description, the user searches for and selects a single frame 25 to be processed from the form. In this exemplary embodiment, selectable frames may be presented to the user, and the user may be able to select a plurality of frames.

FIG. 7 illustrates an example of a form display screen according to this exemplary embodiment, which is the same as the screen illustrated in FIG. 3. In response to the selection of the "automatically extract blanks" button 23 in the form display screen 20, the definition information generation processing unit 12 analyzes the form to extract blanks, or frames, and displays selectable frames in a distinguishable way. In FIG. 7, the blanks are colored in gray, as an example. The user may select one of the colored frames in the way described above or may designate a plurality of frames, for example, using drag-and-drop manipulation to process a plurality of frames together. In FIG. 7, a plurality of frames designated by a box 33 are illustrated. In this state, the user is assumed to select the "automatic setting of frames together" button 24.

FIG. 8 illustrates a principal portion of the form display screen 20 according to this exemplary embodiment and illustrates a portion of the form, which is displayed in response to the user selecting the "automatic setting of frames together" button 24. When the user selects the automatic setting button 29 in the value definition information 28, the definition information generation processing unit 12 extracts candidate keys corresponding to the respective frames and generates and displays key definition information 31 that contains the plurality of frames together (step S116). As described above, since the plurality of frames are selected by the user, the key definition information 31 contains definition information for each of the frames. The definition information generation processing unit 12 automatically assigns frame numbers to the respective frames in the form in the manner illustrated in FIG. 8, and sets a text and a search direction in the key definition information 31 in association with each of the frame numbers in the way described above.

To further set a key for a text, the user selects the corresponding frame number or selects the row of the corresponding frame. In FIG. 8, the key definition information corresponding to frame number (1) is selected as an example, and key definition information 31a corresponding to frame number (1) is displayed in response to the selection operation. Thereafter, the user selects from within the form a text to be added as a candidate key to the frame with frame number (1). For example, the user selects a text "1" 34 in the form. In response to the user's operation, the definition information generation processing unit 12 adds a key to the frame with frame number (1). In the key definition information 31a illustrated in FIG. 8, new key definition information 31a-1 for the text "1" 34 is added in response to the user's operation described above. In the key-value extraction process, with reference to the key definition information 31a, a value located below the text "name" and located to the right of the text "1" 34 is extracted.

In this exemplary embodiment, accordingly, candidate keys may be collectively extracted for a plurality of frames. In addition, a candidate key may be added to a frame.

In this exemplary embodiment, as described above, the key definition information 31 is automatically generated in response to the selection of the automatic setting button 29. In some cases, automatically generated key definition information may be insufficient. Accordingly, this exemplary embodiment provides a mode (i.e., manual setting) for accepting a key that is manually set by the user.

FIG. 9 illustrates a principal portion of the form display screen 20 according to this exemplary embodiment. In the form illustrated in FIG. 9, as indicated by boxes 32 and 35, the text "address" is extracted at two locations in the form. If only the text "address" is set as a key when the frame 25 is selected, the text "address" with the box 35 therearound may be incorrectly extracted as a key in the automatic key-value extraction process.

To address this incorrect extraction, the user selects manual setting to set key definition information by manual input. Specifically, the user selects the frame 25 and then selects the manual setting button 30 in the value definition information 28. In response to the user selecting the manual setting button 30 ("manual setting" in step S106), the definition information generation processing unit 12 displays a blank table 36 containing no key definition information to allow the user to set key definition information. In this manner, the definition information generation processing unit 12 allows the user to input a text indicating a key to be set and a search direction in the displayed table 36 to generate key definition information (step S117).

Figure 10A:
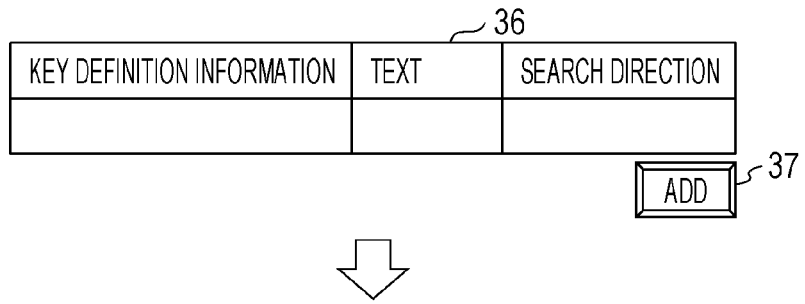
FIGS. 10A to 10D illustrate transitions of key definition information in manual setting according to the exemplary embodiment.
Figure 10B:
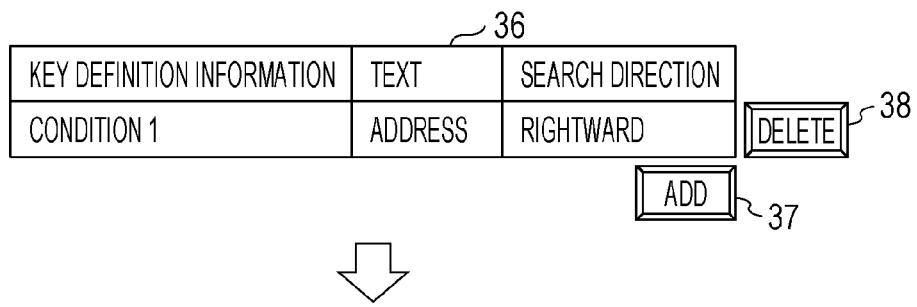

Specifically, in the blank table 36 illustrated in FIG. 10A, which is the same as that illustrated in FIG. 9, as illustrated in FIG. 10B, the user inputs a text serving as a candidate key and the search direction of a value corresponding to the text. The text may be selected from the form. Since the search direction can be designated only from among predetermined values (such as rightward and downward), selectable values may be presented to the user to allow the user to select one of the selectable values as a search direction.

Figure 10C:
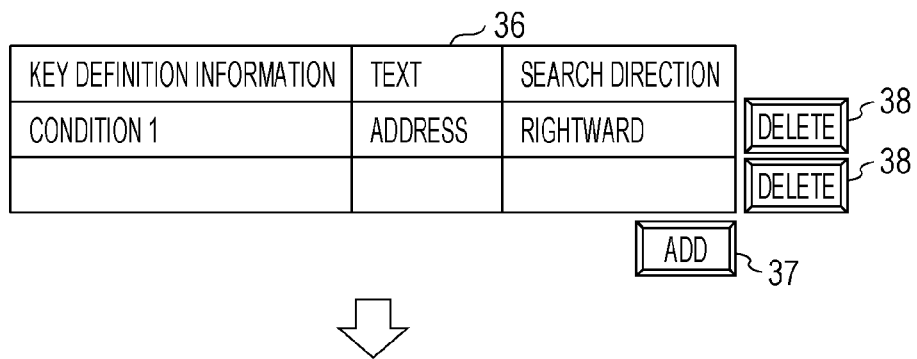
Figure 10D:
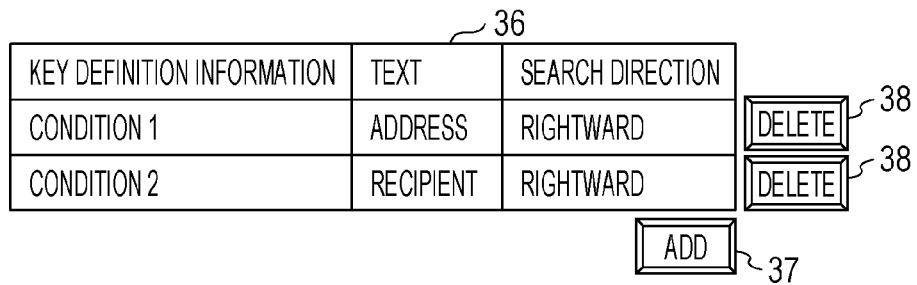

To further set a key for the frame 25, the user selects an "add" button 37 to display a new blank row (FIG. 10C), and inputs new key definition information to the blank row (FIG. 10D). To delete set key definition information, the user selects a "delete" button 38 displayed next to the corresponding row.

Figure 11:
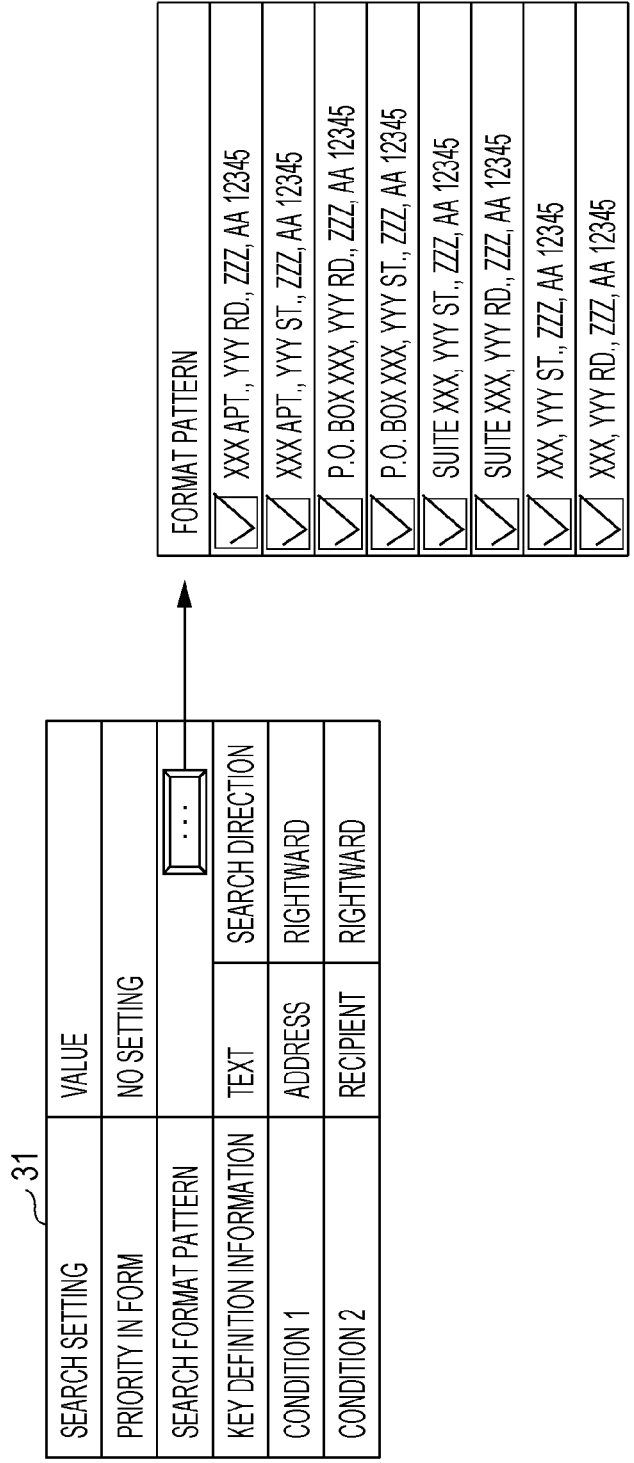
FIG. 11 illustrates another example data structure of the key definition information according to the exemplary embodiment.

FIG. 11 illustrates another data structure of the key definition information 31. In FIG. 11, key definition information containing search setting information in addition to the key definition information illustrated in FIG. 10D is illustrated. In the search setting, a "priority in form" field contains the priority of a detection position in the form. For example, upper left, left, lower left, top, center, bottom, upper right, right, lower right, or the like is designated. If the "priority in form" field contains "upper left", in FIG. 9, the text "address" corresponding to the box 32, which is located in an upper left portion, rather than the text "address"

corresponding to the box 35, is extracted according to priority. A "search format pattern" field designates a format pattern of a value to be extracted so as to correspond to the text. In the example illustrated in FIG. 11, a list of candidate formats for a value related to a text is displayed. The "format pattern" represents a pattern of formats for text data to be entered in a frame, and a person is typically considered to write an address in a format that matches any of the formats in the pattern. The user checks a checkbox of a format to be accepted as the text data from within the list of formats included in the format pattern. Text data written in a checked format is likely to be extracted as an address.

In this way, the user is able to generate key definition information by manual input. As described above, if only the text "address" is set as a key, the text "address" in the box 35 can be erroneously extracted as a key in the automatic key-value extraction process. However, setting the text "recipient" as an additional key ensures that a value detected based on the position of the frame 25 can be extracted.

The form may contain a plurality of texts serving as candidate keys (in FIG. 9, "address"). In this case, a correct value may not be extracted in the automatic key-value extraction process. This may be addressed by the user selecting manual setting, as described above. The following describes a case where the user selects automatic setting.

FIG. 12 illustrates a principal portion of the form display screen 20 according to this exemplary embodiment and illustrates an example screen, which is the same as that illustrated in FIG. 9. In FIG. 9, a display screen in response to the user selecting the manual setting button 30 is presented, whereas in FIG. 12, a display screen in response to the user selecting the automatic setting button 29 is presented.

The user selects the frame 25 and then selects the automatic setting button 29 in the value definition information 28. In response to the user selecting the automatic setting button 29 ("automatic setting" in step S106), the definition information generation processing unit 12 analyzes the form and detects the presence of overlapping texts "address" serving as candidate keys for the frame 25. In this case (Y in step S109), a warning message 39 is displayed together with the key definition information 31 (step S118). In S109, the "text overlapping with a key" may be a text that is the same as a candidate key or may be a synonym having the same meaning or nearly the same meaning as a candidate key. Examples of the synonym include "location" for the candidate key "address".

In response to the warning message 39, the user edits the key definition information 31. Specifically, the user may set the priority of a detection position in the "priority in form" field in the key definition information 31, set a format pattern in the "search format pattern" field, or, as described with reference to FIG. 6, add key definition information. Then, the definition information generation processing unit 12 accepts the editing by the user and edits the key definition information 31. In response to the editing of the key definition information 31, the overlapping texts are assigned priorities, and the definition information generation processing unit 12 removes the text "address" in the box 35 from candidate keys. Then, the warning message 39 is deleted.

As described above, in response to the user selecting automatic setting of key definition information, the definition information generation processing unit 12 automatically generates key definition information. In some cases, forms of the same type may contain different texts corresponding to the frame 25. This may be addressed by generating different pieces of key definition information. If different specific texts indicate the same key, to handle the specific texts as the same key and use the same key definition information, the definition information generation processing unit 12 provides a function to edit key definition information.

FIG. 13 illustrates key definition information included in the form display screen 20 according to this exemplary embodiment. In the foregoing description, an editing operation such as adding a new record in key definition information is performed. The following provides a function to edit a generated record. When the user is to edit a generated record (Y in step S111), the definition information generation processing unit 12 causes the user to edit key definition information. In example settings of key definition information illustrated in FIG. 13, "address" is set as a text by automatic setting of key definition information. The user edits the key definition information by manual input such that the conjunction "or", followed by "location", is added to "address" (step S119). Thus, the same key definition information is shared by a form containing the text "location".

FIG. 14 illustrates a principal portion of the form display screen 20 according to this exemplary embodiment. In this exemplary embodiment, key definition information is generated after the user designates a frame. The frame is used to designate a detection position of a value. The following describes an operation of identifying a value by using a format pattern in a case where no frame is provided.

In this case, the user selects the manual setting button 30 in the value definition information 28 without designating a frame. The definition information generation processing unit 12 displays a table 31 indicating key definition information in response to the user's selection operation. Subsequent transitions of the screen will be described with reference to FIGS. 15A to 15C.

In FIG. 15A, in response to the user selecting a button 40 in the table 31, as illustrated in FIG. 15B, an input field for key definition information is displayed. The user manually inputs key definition information in the input field. FIG. 15C illustrates key definition information 31 after manual input. To correctly extract a value without a frame, regular expressions are defined in advance as formats of a value. Specifically, as illustrated as an example in FIG. 15C, to express a fiscal year, the characters "fiscal year" or "FY" are followed by a four-digit number. Such formats are defined in advance by regular expressions. The user enters data in the key definition information 31 in accordance with the regular expression. Although not illustrated in FIGS. 15A to 15C, as illustrated in FIGS. 10A to 10D, a row for inputting key definition information may be added and deleted by using an "add" button and a "delete" button, respectively.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A form processing apparatus comprising:
a processor configured to:
obtain and display a form to be processed;
accept, from a user, an area filled in with text data, the area being included in the form to be processed;
extract a text in a neighboring area and located at a position within a predetermined distance away from the accepted area as a candidate for an item, wherein the accepted area is a closed area surrounded by borders, and wherein the neighboring area is different from the accepted area; and
register the item in associated with the extracted text data.

2. The form processing apparatus according to claim 1, wherein the processor is further configured to display the candidate for the item such that the candidate is assigned a priority in accordance with at least one of a distance of the text from the area or a direction of the text relative to the area.

3. The form processing apparatus according to claim 1, wherein the processor is further configured to, in response to designation of a plurality of areas each of which is to be filled in with data to be extracted, collectively display candidates for the item, each of the candidates corresponding to one of the plurality of designated areas.

4. The form processing apparatus according to claim 3, wherein the processor is configured to
display identifiers, each for one of the plurality of areas, and
display each of the identifiers in association with the candidate for the item corresponding to the area related to the identifier.

5. The form processing apparatus according to claim 1, wherein the processor is further configured to accept editing of the candidate for the item.

6. The form processing apparatus according to claim 1, wherein the processor is further configured to, after displaying the candidate for the item, add another text designated by the user in the form to be processed as a new candidate for a new item.

7. The form processing apparatus according to claim 5, wherein the processor is further configured to, after displaying the candidate for the item, add another text designated by the user in the form to be processed as a new candidate for a new item.

8. The form processing apparatus according to claim 1, wherein the processor is further configured to notify the user when an overlapping text is present at a position different from the position within a predetermined distance away from the accepted area in the form to be processed, wherein the overlapping text is a text that is the same as the candidate or a synonym of the candidate.

9. The form processing apparatus according to claim 1, wherein the processor is further configured to provide a mode for accepting the item from the user.

10. The form processing apparatus according to claim 1, wherein the processor is further configured to generate definition information indicating a positional relationship between the candidate for the item and the area.

11. The form processing apparatus according to claim 10, wherein the processor is further configured to provide a function to edit the definition information.

12. A non-transitory computer readable medium storing a program causing a computer to execute a process for form processing, the process comprising:
obtaining and displaying a form to be processed;
accepting, from a user, an area filled in with text data, the area being included in the form to be processed;
extracting a text in a neighboring area and located at a position within a predetermined distance away from the accepted area as a candidate for an item, wherein the accepted area is a closed area surrounded by borders, and wherein the neighboring area is different from the accepted area; and
registering the item in associated with the extracted text data.

13. A form processing apparatus comprising:
means for obtaining and displaying a form to be processed;
means for accepting, from a user, an area filled in with text data, the area being included in the form to be processed;
means for extracting a text in a neighboring area and located at a position within a predetermined distance away from the accepted area as a candidate for an item, wherein the accepted area is a closed area surrounded by borders, and wherein the neighboring area is different from the accepted area; and
means for registering the item in associated with the extracted text data.

* * * * *